United States Patent [19]

Sallee

[11] Patent Number: 5,593,239
[45] Date of Patent: Jan. 14, 1997

[54] EXTENDABLE SUPPORT POLE

[75] Inventor: Bradley T. Sallee, Austin, Tex.

[73] Assignee: Tracor, Inc., Austin, Tex.

[21] Appl. No.: 234,147

[22] Filed: Apr. 28, 1994

[51] Int. Cl.⁶ ............................................ F16B 7/14
[52] U.S. Cl. ........................ 403/109; 403/377; 285/316;
    285/303; 135/99; 135/114; 135/142; 135/151;
    248/411
[58] Field of Search ........................... 285/316, 298,
    285/303, 302; 403/109, 377, 376, 325,
    321, 326, 322, 327, 220, 291, 229, 122,
    217, 119; 135/114, 139, 141, 125, 135,
    138, 151, 90, 99, 126, 140, 142, 25.1; 248/411,
    412, 188.5

[56] References Cited

U.S. PATENT DOCUMENTS

| | | | |
|---|---|---|---|
| 1,022,197 | 4/1912 | Kiel | 403/122 X |
| 1,109,513 | 9/1914 | Cooke | 135/114 |
| 1,691,411 | 11/1928 | Roth et al. | 135/114 |
| 2,146,517 | 2/1939 | Thompson | 135/114 X |
| 2,684,822 | 7/1954 | Odin | 403/229 X |
| 2,705,119 | 3/1955 | Ingwer | 248/412 |
| 2,947,558 | 8/1960 | Schwab et al. | 135/114 X |
| 3,257,091 | 6/1966 | Miller | 403/122 X |
| 3,304,035 | 2/1967 | Davis | 135/75 X |
| 3,330,582 | 7/1967 | Morris | 135/114 |
| 3,351,363 | 11/1967 | Downey et al. | 285/303 |
| 3,446,523 | 5/1969 | Little | 135/114 X |
| 3,656,494 | 4/1972 | Cornett et al. | 285/303 X |
| 3,866,619 | 2/1975 | Per Frisk | 135/114 |
| 4,265,261 | 5/1981 | Barker | 135/141 X |
| 4,408,260 | 1/1983 | Miedel | 135/114 |
| 4,596,405 | 6/1986 | Jones | 135/75 X |
| 5,033,528 | 7/1991 | Volcani | 403/122 X |
| 5,135,018 | 8/1992 | Anderson | 135/114 X |
| 5,240,023 | 8/1993 | Shelef et al. | 285/316 X |
| 5,332,266 | 7/1994 | Canale | 285/316 X |

FOREIGN PATENT DOCUMENTS

| | | | |
|---|---|---|---|
| 351439 | 1/1990 | European Pat. Off. | 285/316 |
| 318445 | 12/1969 | Sweden | 285/316 |
| 1224305 | 3/1971 | United Kingdom | 285/316 |

Primary Examiner—Terry Lee Melius
Assistant Examiner—Heather Shackelford
Attorney, Agent, or Firm—Arnold, White & Durkee

[57] ABSTRACT

A telescoping support pole suitable for supporting tarpaulins or camouflage netting is described. The pole is made up of a plurality of tubes that nest within one another for storage. To deploy the pole, the tubes are extended in a telescoping fashion. Ball locks are provided for maintaining the extended poles in desired longitudinal relationships. The ball locks are activated by spring loaded collars that force balls into circumferential grooves formed in the outside surfaces of the inner telescoping tubes. The collars may be manually operated to release the ball lock mechanism to permit the pole length to be adjusted or to permit the tubes to be nested within one another for storage. Pivoting fixtures suitable for use at the upper end of the support pole are also described.

17 Claims, 4 Drawing Sheets

EXTENDABLE SUPPORT POLE

BACKGROUND OF THE INVENTION

The present invention relates to support poles. In particular, an extendable pole is provided for supporting articles above the ground or floor, such as camouflage netting and tarpaulins. The support pole of the present invention is particularly well suited for use in hostile environments due to its high degree of resistance to fouling caused by environmental contamination.

Presently known poles adapted for supporting camouflage netting ("camo poles") are commonly manufactured from fiberglass or aluminum and are divided into segments that plug together using conventional tent pole techniques. The incremental length adjustment available for this type of pole is limited to the length of the pole segments. It is desirable to provide a support pole that provides smaller incremental length adjustments.

Other types of known camo poles provide continuous length adjustment capability using friction mechanisms. Most presently available designs for telescoping poles use (1) a metal tang with a hole in it attached to the top of the lower pole segment by an articulating wire link that acts as a one way ratchet allowing extension but not retraction, or (2) a camming type lock that forces an inner tube cam radially into the inner surface of the outer tube to lock the tubes to a selected length. Both of these telescoping pole designs rely on friction to support the full load placed on the pole, and they can become fouled or weakened by water, sand, or other environmental factors. Furthermore, these types of locking mechanisms tend to collapse completely if the pole is overloaded.

A telescoping camo pole is needed that has an adjustable length but that does not rely entirely on a friction lock to support the load placed on the pole, and that is highly resistant to fouling by sand, mud and other environmental factors.

SUMMARY OF THE INVENTION

The present invention provides a telescoping support pole that has a locking mechanism that provides a solid mechanical lock rather than a friction lock, and that provides predictable, and therefore designable, load bearing capacity. The mechanical lock features a ball lock mechanism that causes the failure mode to be non-catastrophic and capable of absorbing large amounts of energy.

The locking mechanism of preferred embodiments of this invention has self-clearing features to eliminate sand and mud contamination, allowing poles constructed according to the present invention to operate reliably in hostile environments. The locking mechanism of the present invention is operated by axial displacement of collars located at the ends of the outer tubes. The collars are configured to force locking balls into circumferential grooves formed in the outside surfaces of the inner tubes. The use of circumferential grooves in both the collars and the pole sections allows the collar to be rotated without releasing the locking mechanism. Rotation of the collar drives the sand and mud out through vertical grooves that may be positioned in the bottom of the collar, clearing the locking mechanism of such contamination. The circumferential grooves also serve to allow sand to "squirt" sideways during locking and unlocking, eliminating mechanism failures that occur when other ball lock mechanisms use activation grooves or pockets parallel to the longitudinal axis of the pole.

Boreriders, which are constrictions in the inside diameter of the outer tubes or projections from the outside surface of the inner tubes, are provided to space the outer surfaces of the inner tubes from the inner surfaces of the outer tubes. This spacing helps to ensure that contamination, such as sand, that gets between the nested tubes does not lock them together. Some or all of the boreriders, in particular at the bottom of the tubes, are segmented to allow contamination such as sand, water or mud to escape through the bottom of the tubes.

The top end of the top segment of the support pole according to this invention may be configured in any desired way to effect the desired application. For example, the top end of the outer surface of the pole may be threaded for attachment of a variety of accessories. Alternatively, the top of the pole may be equipped with a flexible fixture ("flexture"), which may include a ball pivot. The flexible fixture may be provided with a threaded bore or surface at the end of the fixture for engaging a bolt, nut or other appliance. In preferred embodiments, an inverted v-barb may be threaded into such a threaded bore. An inverted v-barb is used to engage a reinforcing hole in a net or tarpaulin. This serves to attach the load to the pole, eliminating the problem of the net or tarpaulin lifting off of the pole and causing the pole to fall. Batten spreaders may be used with a pole according to this invention, held in place either by, e.g., a bolt or an inverted v-barb end effector.

The use of a flexible fixture on the end of the pole allows the pole to be somewhat isolated from the bending moments induced by a batten spreader and a net or tarpaulin. This greatly increases the load carrying capability of the net/pole structure.

In a preferred embodiment having a ball-pivot fixture on the end of the pole, the ball pivot contains a detente mechanism which tends to keep the ball pivot axially aligned with the rest of the pole, but which allows it to pivot when relatively light bending moments are applied. This detente mechanism keeps the fixture, which may include a batten spreader, in a fixed position relative to the pole during deployment, and then allows the fixture to break loose and pivot when in contact with the load, such as a net or tarpaulin. This eliminates problems during deployment caused by the fixture or batten spreader "flopping around" and causing difficulty in engaging a reinforcing hole that is provided in the net or tarpaulin.

A tie-down loop may be provided at the bottom of the pole to allow the bottom of the pole to be staked down. This eliminates problems that may occur when the support pole is lifted by the netting or the tarpaulin that it is attached to. This helps prevent the poles from falling over on the objects that are stored beneath the supported structure due to displacement of the bottom end of the pole.

A full diameter pull collar is provided at each joint between pole sections to operate the locking mechanism. In preferred embodiments, the locking mechanism is released by pulling downward on the collar, allowing the inner pole section to slide with respect to the outer, or lower, pole section. This allows a natural pulling movement to be used to simultaneously push down on the collar while pulling upward on the inner pole segment to extend the pole. The locking mechanism is activated by releasing the downward pressure on the collar. The upper pole can then be extended outward further until the next circumferential groove on the inner pole section is aligned with the locking mechanism, at which point the lock will click into place. Similarly, the pole may be shortened or retracted by pushing down on a collar while supporting the upwardly adjacent segment, and then allowing the upper segment to fall into the lower segment while the collar is held in the downward, unlocked position.

The present invention therefore provides an improved telescoping support pole that is readily adjustable using positive mechanical locks between tubes, and that is highly resistant to fouling (between tubes and in the locking mechanisms) due to contamination from sand, mud or other environmental factors.

These and other advantages of the present invention will be further appreciated from the drawings and from the detailed description provided below.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiment thereof which is illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

FIG. 6 shows the fixture mounted on the upper end of a support pole. FIG. 7 shows a cross section of the pivot portion of the fixture, and FIG. 8 shows a cross section of the ball portion of the fixture.

DETAILED DESCRIPTION OF THE PREFERRED EMBODIMENTS

Figure 1:
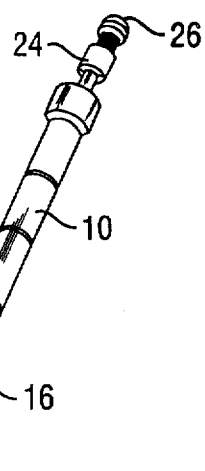
FIG. 1 is a perspective view of an extended support pole according to the present invention.

FIG. 1 illustrates the telescoping support pole according to this invention in an extended configuration. The embodiment illustrated in FIG. 1 has top tube 10, bottom tube 12 and middle tubes 14. These tubes may be manufactured from aluminum, or alternatively from other materials such as, for example, other metals, plastic, graphite, or fiberglass. Each of bottom tube 12 and middle tubes 14 has a locking collar 16 positioned at its upper end. Each tube except the bottom tube has one or more circumferential grooves 18 located in its outer surface. As will be discussed in detail below, the telescoping support pole according to this invention can be locked into any desired length where a circumferential groove 18 is aligned with the locking mechanism contained within a collar 16.

The support pole according to this invention may include a foot cap 20 and tie down cables 22. In a preferred embodiment, the foot cap is manufactured from an elastomer, such as HYTREL polyester elastomer, to provide stability on a variety of surfaces upon which the pole may be used, Tie down cable 22 may be used to anchor the bottom of the pole to the floor or ground to provide added stability. In many applications where poles such as this may be used, such as for supporting a net or tarpaulin, the net or tarpaulin may be inclined to try to lift the pole off the ground due to wind action, and tie down cables 22 are used to retain the base of the pole on or near the ground and to retain the base of the pole in the desired position.

FIG. 1 also shows a pivoting fixture 24 connected to the top of the pole. Pivoting fixture 24 may include a ball and pivot connection which allows the load attached to the top of the pole to pivot with respect to the longitudinal axis of the pole. The fixture may be provided with a threaded bore at its upper end to receive bolt 26 or any other desired appliance.

Figure 2:
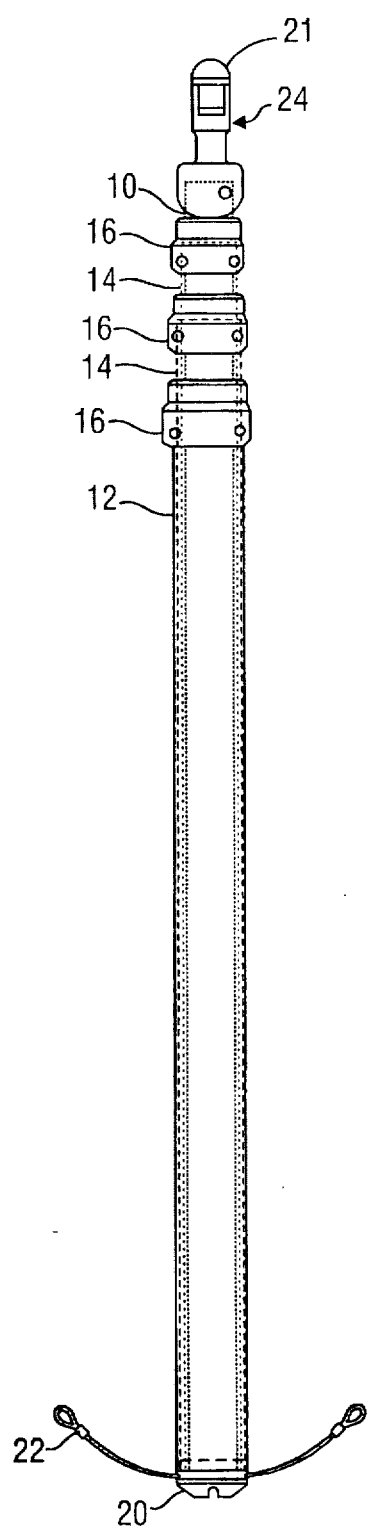
FIG. 2 is an elevation view of a collapsed support pole according to the present invention.

FIG. 2 shows an elevation view of the pole of FIG. 1 in its collapsed position. Each of the tubes is nested within the tube immediately below it. Bottom tube 12 is on the outside, and middle tubes 14 and top tube 10 are telescoped within bottom tube 12. FIG. 2 shows that foot cap 20 has a portion that is inserted within bottom tube 12 and securely attached thereto. In preferred embodiments, foot cap 12 is manufactured from an elastomer provides a soft bump stop for the middle and top tubes when they are collapsed, to prevent damage to their lower ends when they are dropped within bottom tube 12. The foot cap 12 at the bottom of the pole and the fixture 24 at the top of the pole also serve to provide an air seal or restriction at each end of the support pole. This causes an air dampening effect when the pole is collapsed, restricting the rate of collapse of the tubes and preventing damage to the pole components and to the operator. In a preferred embodiment shown in FIG. 2, tie down cables 22 are illustrated as wires with crimped loops at their outer ends. Any number of tie down cables could be used as required for a particular application. Also, the design of foot cap 20 could be altered for particular applications. For example, in some environments it may be desirable for foot cap 20 to have a spike extending from its bottom side to help anchor the pole to the ground. In preferred embodiments, foot cap 20 is provided with a hole to permit communication between the inside of the tubes and the outside to permit contamination such as water or sand to exit through the bottom of the support pole.

Figure 3:
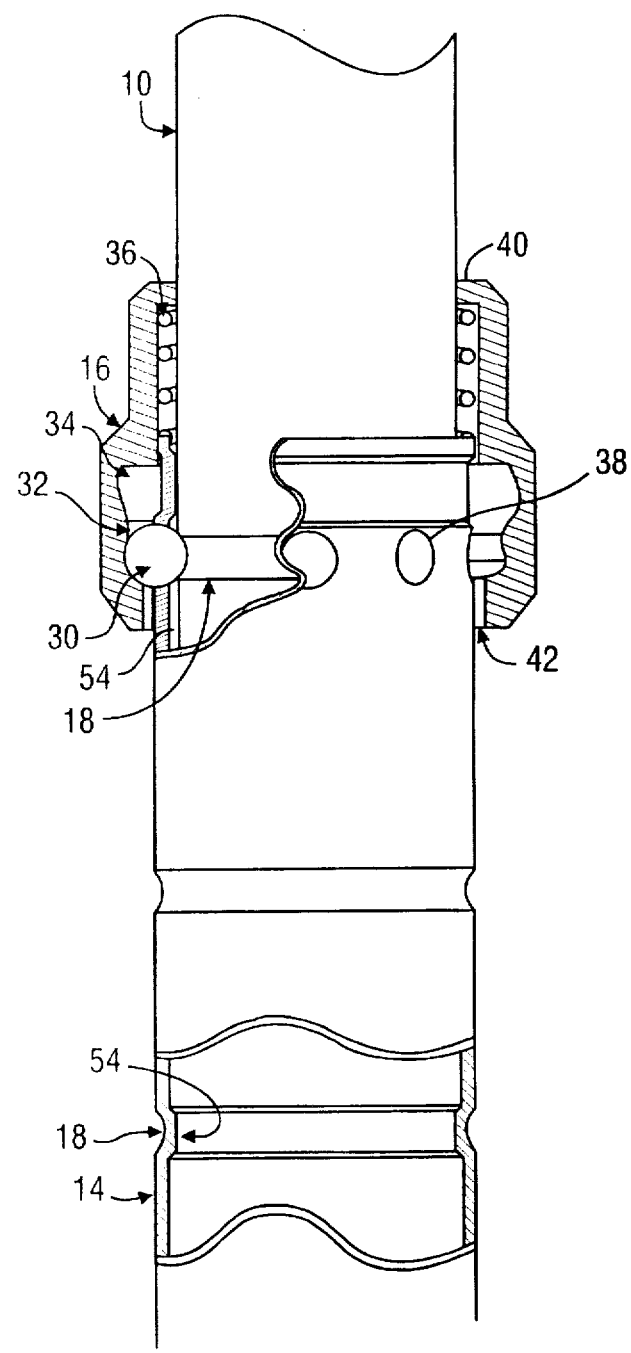
FIG. 3 is a partial cross section illustrating the ball lock mechanism and the borerider feature of the present invention.

FIG. 3 shows a detailed view of the ball locking mechanism that is used in preferred embodiments of this invention to adjustably lock the support pole at the desired length. The example shown in the figure may be the joint between middle tube 14 and top tube 10 or it may be the joint between two middle tubes. (For the purpose of describing the operation of the ball lock mechanism, this description will refer to inner tube 10 and outer tube 14. The bottom tube is an outer tube with respect to the next smaller tube.) Locking of an inner tube 10 into position with respect to an outer tube 14 according to preferred embodiments of this invention is effected by securely pressing a plurality of balls 30 into a circumferential groove 18 formed in the outer surface of the inner tube. This is accomplished by the use of a collar 16 that is attached to the outer tube 14. Collar 16 is constructed with a circumferential locking groove 32 and a slightly larger circumferential release groove 34. These two grooves are formed in the inside of collar 16. The outer diameter of locking groove 32 is substantially equal to the diameter of circumferential groove 18 on inner tube 10 plus the diameters of two balls 30. Thus, when the collar is in its upward position, to which it is urged by spring 36, balls 30 cannot move radially outward because they are held in place by locking groove 32. This arrangement provides a solid mechanical lock to maintain the two poles in a longitudinally fixed relationship.

When it is desired to release the inner tube 10 with respect to outer tube 14, collar 16 is pushed downward against spring 36 until the balls are aligned with release groove 34 rather than locking groove 32. Release groove 34 has a diameter that is larger than that of locking groove 32 by approximately twice the depth of circumferential groove 18 on inner tube 10. When collar 16 is pressed downwardly, compressing spring 36, release groove 34 becomes aligned with the radial plane containing balls 30, allowing the balls to move outwardly out of circumferential groove 18, and thus permitting inner tube 10 to slide with respect to outer tube 14. Holes 38 are formed in outer tube 14 through which balls 30 can protrude inwardly to engage circumferential grooves 18. The holes 38 are slightly larger in diameter than balls 30, and each ball 30 is held captive within the corresponding hole and between the collar 16 and the inner tube 10.

In the preferred embodiment illustrated in the figures, eight balls are provided, equally spaced around the circumference of the support pole. Eight holes 38 are provided in the outer tube 14, corresponding with each of the balls. The number of balls and holes to provide is a matter of design choice to provide the required load-bearing capacity. Larger tubes may be provided with a greater number of balls and corresponding holes if desired. When collar 16 is released, spring 36 pushes upwardly on the collar, tending to realign balls 30 with locking groove 32. When the balls are not aligned with one of the circumferential grooves 18 on tube 10, balls 30 are pushed outwardly by the outer surface of tube 10 into release groove 34, preventing collar 16 from moving upwardly relative to outer tube 14. As inner tube 10 is slid within outer tube 14 to extend or retract the pole to a point where one of circumferential grooves 18 on inner tube 10 is aligned with balls 30, balls 30 will move radially inwardly into circumferential groove 18, permitting collar 16 to move upwardly into the position shown in FIG. 3 such that the balls become aligned with locking groove 32. At that point, balls 30 are no longer free to move radially outwardly out of circumferential groove 18, and thus a solid mechanical lock is achieved between outer tube 14 and inner tube 10.

Figure 5:
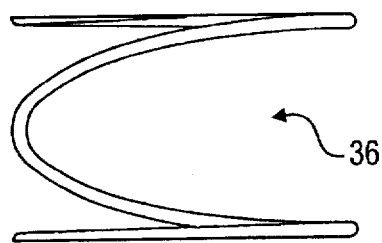
FIG. 5 illustrates a spring that may be used in the ball lock mechanism of the present invention.

Spring 36 is positioned between the end of outer tube 14 and spring retaining flange 40, which is formed at the upper end of collar 16 in preferred embodiments. A spring which may be suitable for this application is illustrated in FIG. 5. The illustrated spring contains one active turn and two ¾ dead turns, and it may be made from 300 Series CRES, full hardness.

Figure 10:
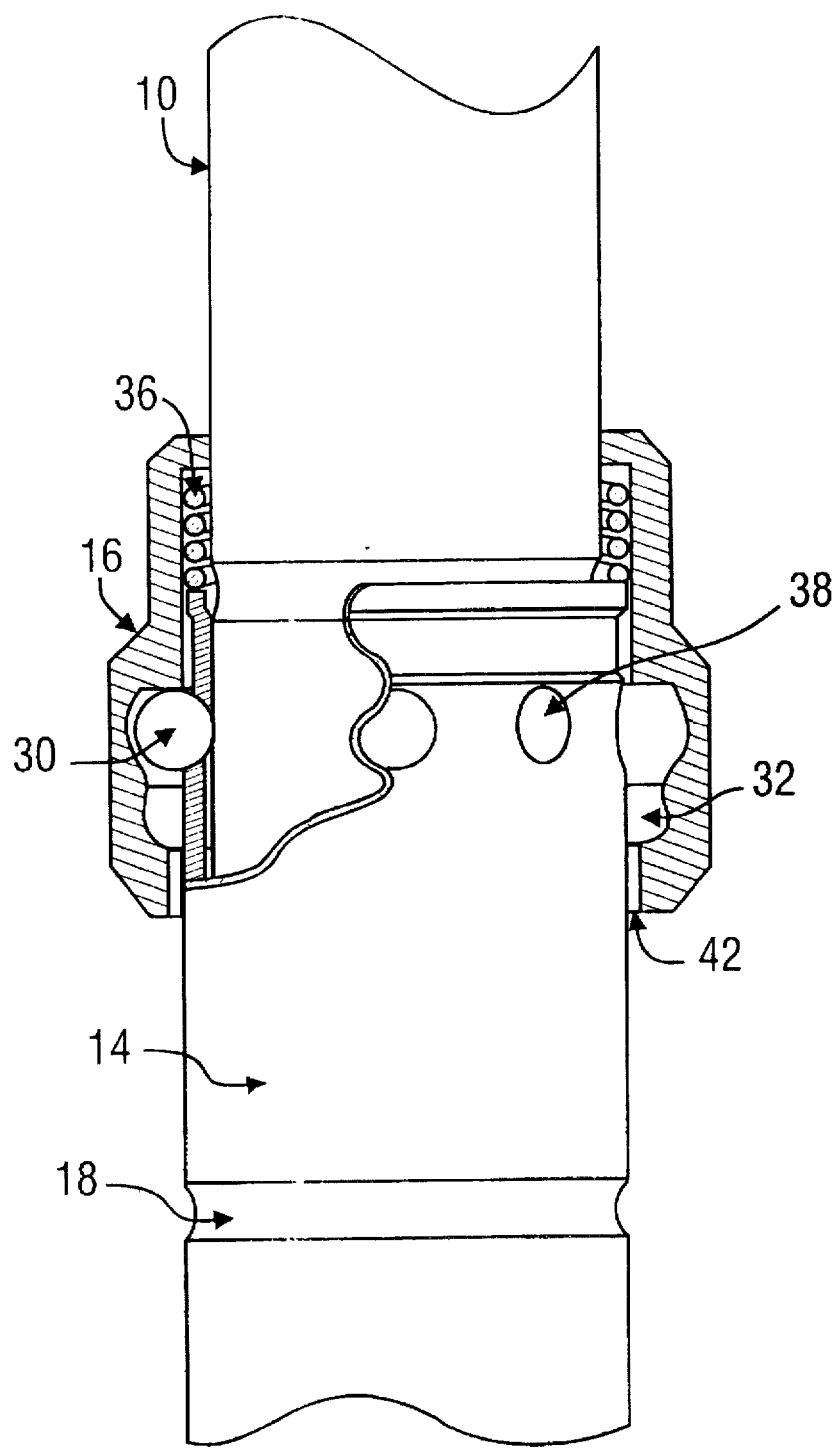
FIG. 10 is a cross-sectional view of the collar and ball lock mechanism of the present invention, shown with the collar and balls in the released position.

FIG. 10 illustrates the ball lock mechanism with the collar 16 moved downward into the release position. In this position, spring 36 is compressed and ball 30 is displaced outwardly into release groove 34, permitting inner tube 10 to slide freely within outer tube 14. When the downward force on collar 16 is released, spring 36 urges collar 16 toward the locked position (as shown in FIG. 3). When balls 30 are not aligned with a circumferential groove 18, they are maintained in their outwardly disposed positions in release groove 34, preventing collar 16 from returning to the locked position. Only when the balls 30 become aligned with a circumferential groove 18 on inner tube 10 (so that they can move inward) is the collar 16 able to return to the locked position.

In preferred embodiments, collar 16 is also provided with vertical bottom slots 42 around the inner periphery of the bottom of its structure. These slots permit sand, mud, or other contamination which may be introduced into collar 16 to fall out so as to prevent interference of such contamination with the mechanism. Collar 16 is rotatable around the tube 14 to which it is attached, as well as longitudinally movable up and down. In use, rotational movement may be helpful to clear contamination from the collar before the lock mechanism is operated by pushing the collar downward against the spring force.

Figure 4:
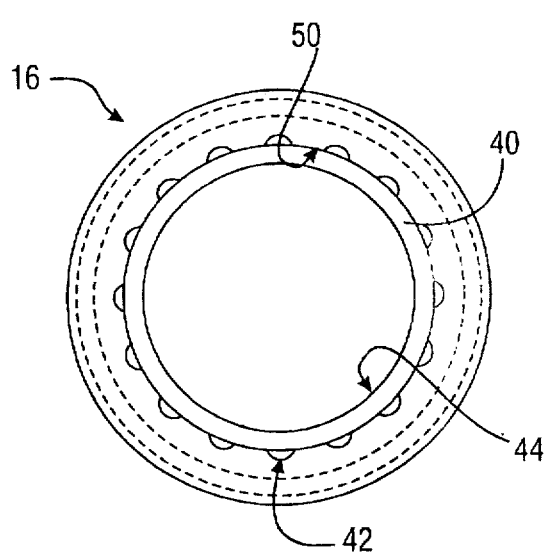
FIG. 4 is a plan view of a collar that is used in the ball lock mechanism of the present invention.

A plan view locking into the bottom of collar 16 is illustrated in FIG. 4. The inside diameter 44 of spring retaining flange 40 at the top of the collar is smaller than the inside diameter 50 of the bottom of the collar because it is intended to encircle inner tube 10, which has a smaller outside diameter than does outer tube 14. Vertical slots 42 can be seen end-on in FIG. 4. In a preferred embodiment, collar 16 is manufactured from nylon with 30% fiberglass. Other materials known in the art may be used to manufacture this component.

It is important for military and other applications in inhospitable environments to prevent the telescoping tubes from becoming jammed together. In the presently preferred embodiments of this invention, such as that illustrated in FIG. 3, internal boreriders, which are internal circumferential restrictions in the larger or outer tube, are provided within each of the bottom and middle tubes. Each of these restrictions is slightly larger than the outside diameter of the next smaller tube. These boreriders provide a series of rings within each outer tube that separate the inner tube from the outer tube along most of the length of overlap between the two tubes. Referring to FIG. 3, an internal borerider 52 is provided near the upper end of outer tube 14 in order to center inner tube 10 within outer tube 14 and to provide a space 54 between the inside wall of outer tube 14 and the outside wall of inner tube 10. This relationship applies to each pair of tubes that nest within one another. Additional internal boreriders, such as shown at 54, may be formed to correspond with each circumferential groove that is formed in the middle and top pole segments. Additional boreriders can be formed as required by a particular application. In preferred embodiments some of the boreriders may be segmented, that is, they may not completely encircle and block the space formed between the two tubes. Segmented boreriders are useful for providing channels to allow contamination to escape from the space between the telescoping tubes.

In preferred embodiments, each inner tube (each tube that nests within a larger outer tube) has an external borerider extending radially outward proximate its lower end. This external borerider is preferably segmented. The external borerider on each inner tube may be made larger in diameter than the top borerider on the tube that it nests within. This arrangement keeps the tubes captive so that they cannot separate if overextended.

The boreriders, circumferential grooves, and holes are preferably spaced so that at each relative position where the balls are locked in a circumferential groove on an inner tube, the external borerider at the bottom of that inner tube is aligned with an internal borerider formed in the corresponding outer tube. This minimizes the clearances between tubes when they are locked in position, thus making the pole more rigid. This rigidity is caused by the close clearance at the internal borerider at the top of the outer tube and the close clearance at the aligned internal and external boreriders at the bottom of the inner tube. When the locking mechanism is released, the close clearance at the aligned boreriders is opened by only slight movement of the tubes. This arrangement reduces jamming of the tubes, and it allows contaminants that may have entered the space between the inner and outer tubes to fall out of the tubes.

Of course, support poles according to this invention may be made having as many tube segments as required, and each tube segment may have one or more circumferential grooves and boreriders located at any desired position. A support pole that is intended to be used only for a particular fixed height application may be provided with only one circumferential groove per middle tube and top tube, while a pole intended for adjustable length applications may have circumferential grooves provided at spaced intervals on one or more of the pole segments. A circumferential groove may be provided near the top end of each tube (except the bottom tube) in order to allow engagement of the locking mechanisms when the support pole is in its collapsed condition.

Any desired type of fixture may be used at the upper end of the top tube of a support pole according to this invention. Several types of fixtures will be described with specificity herein, however the invention is not limited to a pole having a particular type of fixture. Indeed, the upper end of the pole may be left bare, it may be provided with a plain end cap, or it may be threaded to accommodate the attachment of an assortment of correspondingly threaded fixtures.

Figure 6:
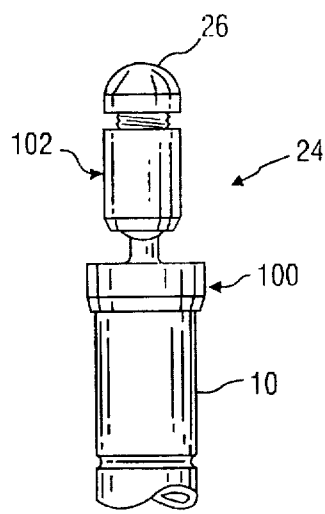
FIGS. 6–8 illustrate an end fixture for the present invention comprising a ball and socket pivot.
Figure 7:
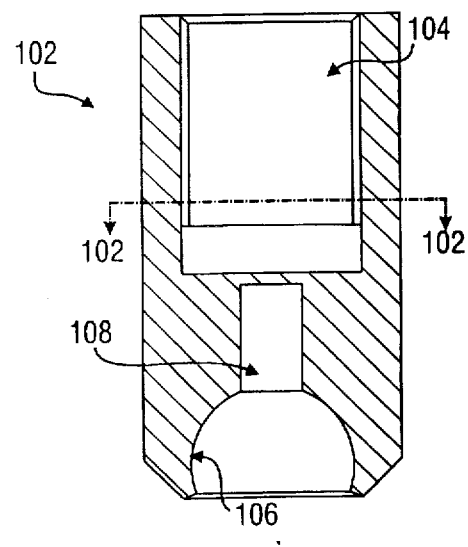
Figure 8:
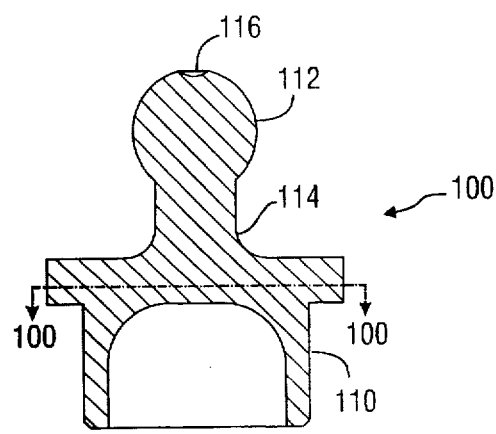

For general use in supporting loads such as tarpaulins or netting, such as camouflage netting, it is desirable to have a flexible fixture which permits the connection between the top of the pole and the load to absorb angular variations in the relationship between the supported object and the longitudinal axis of the pole. The pivoted fixtures shown in FIGS. 6–9 are suitable for that purpose. FIGS. 6–8 show a ball pivot fixture according to a preferred embodiment. Fixture 24 includes two components, ball end 100 and pivot 102. Pivot 102, as illustrated, comprises a threaded inner bore 104 that accepts threaded bolt 26. At its lower end, pivot 102 comprises ball socket 106 and detente spring chamber 108. Ball end 100 comprises end cap 110 to which ball 112 is connected via neck 114. In the presently preferred embodiment, ball 112 includes detente dimple 116 on the side of the ball opposite neck 104. Ball end 100 and pivot 102 may be manufactured from nylon or other suitable materials known in the art. Detente chamber 108 holds a spring and a detente ball (not shown). When ball 112 is inserted into ball socket 106, the detente ball (not shown) is urged into detente dimple 116 by detente spring (not shown). This detente mechanism will retain pivot 102 axially aligned with the support pole, but will allow pivot 102 to break away and pivot with respect to the support pole at a slight urging from the load which is attached to pivot 102. End cap 110 is designed to be insertible into the upper end of top tube 10 and attached thereto by suitable means. Providing a substantially airtight end cap on the upper end of tube 10 provides a benefit in that it prevents the tubes from falling too rapidly when they are retracted due to the effect of the air cushion that is created within the pole.

Figure 9:
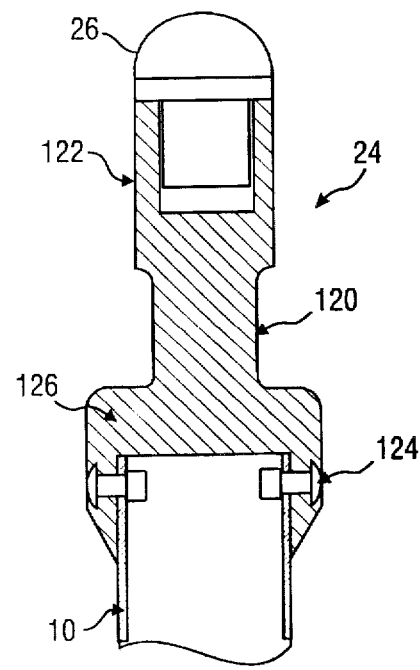
FIG. 9 is a cross section of an alternative flexible end fixture having a flexible neck and attached to the end of a support pole.

Another preferred flexible fixture is illustrated in FIG. 9. In this embodiment, rather than providing a ball and socket pivot mechanism, the fixture is manufactured, at least in part, from a flexible material, such as HYTEL polyester elastomer, that is flexible enough in neck portion 120 to permit head portion 122 to deviate substantially from the longitudinal axis of the upper tube 10. Fixture 24 as shown in FIG. 9 may be secured to upper tube 10 by rivets 124 or other means. A bump stop 126 is also provided by fixture 24 to prevent the upper end of upper tube 10 from falling into the tube into which it nests. The upper end of the support pole according to this invention could also be provided with a spear fixture or an inverted v-barb fixture for penetrating a grommet or other hole in a net or tarpaulin to be supported. The inverted v-barb fixture provides the advantage of securely attaching the load to the fixture to prevent it from being disconnected due to lifting of the load caused by the wind.

The locking mechanism used to secure the positions of adjacent tubes relative to one another, as described above, provides the additional benefit of allowing rapid extension of the tubes. When balls 30 are not positioned in a circumferential groove 18 and collar 16 is in the release position, the ball locking mechanism will skip over the circumferential grooves on the inner tube when the inner tube is rapidly extended from the adjacent outer tube. Extension of the tubes may then be slowed as the desired circumferential groove is approached, allowing time for the collar to move upward at the urging of spring 36 into the lock position when the balls move radially inward into desired circumferential groove 18.

The present invention provides an advantageous failure mode over the prior art. If the load placed upon the support pole is greater than the pole structure can bear, the pole will normally fail at one of the ball lock connections between the tubes. The balls 30 at that connection will be pressed downwardly into the outer surface of the inner tube past circumferential groove 18, plastically deforming the wall of the inner tube, because balls 30 are not permitted to move outward due to the restriction provided by locking groove 32 (referring to FIG. 3). Thus, rather than collapsing completely, a support pole according to this invention that becomes overloaded will ordinarily shorten itself as much as is necessary to cure the overload condition, but will continue to provide support at its shortened length. After an overload event has occurred, the pole can be repaired by merely replacing the tube that has been deformed. If spare parts are not available, the deformed tube can ordinarily remain in service until repairs can be made.

Further modifications and alternative embodiments of this invention will be apparent to those skilled in the art in view of this description. Accordingly, this description is to be construed as illustrative only and is for the purpose of teaching those skilled in the art the manner of making and using the invention. It is to be understood that the forms of the invention herein shown and described are to be taken as the presently preferred and illustrative embodiments. Various changes may be made in the shape, size and arrangement of components. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A telescoping pole comprising:
   a bottom tube having a locking collar whose bottom end encloses the bottom tube in a slidable and rotatable relation and is slotted to permit contamination to fall out of the collar, the collar having a circumferential locking groove and a circumferential release groove; and
   a top tube slidably disposed within the bottom tube in a telescoping manner, the top tube having at least one circumferential groove, the top tube being operably moveable between a retracted position wherein it is substantially contained within the outer tube, and an extended position wherein the top tube is locked in position extended from the bottom tube.

2. The pole of claim 1, further comprising a connecting fixture attached to a top end of the top tube.

3. The pole of claim 2, wherein the connecting fixture comprises a threaded bore for receiving a retaining bolt.

4. A pole comprising:
- a generally cylindrical bottom tube having a slidable locking collar assembly connected to an upper end of the bottom tube;
- a generally cylindrical top tube slidably disposed within the upper end of said bottom tube in a telescoping manner, the top tube having at least one circumferential groove, the top tube being operably moveable between a retracted position wherein it is substantially contained within the outer tube, and an extended position wherein the top tube is locked in position at least partially extended from the bottom tube;
- the locking collar assembly comprising a slidable collar having a locking groove and a release groove, said collar being slideably connected to an end of said bottom tube, a plurality of locking balls held captive between said top tube and said collar, and a bias spring operably positioned within an annular space formed between the locking collar and the top tube;
- a head member connected to the top end of the top tube; and
- a pivot member coupled to the head member to form a ball-and-socket joint, said pivot member being adapted to be connected to the load.

5. The pole of claim 4, further comprising a connecting fixture attached to the top end of the top tube.

6. The pole of claim 5, wherein the connecting fixture comprises threaded bore for receiving a retaining bolt.

7. A pole comprising:
- a generally cylindrical bottom tube having a sliding locking collar assembly connected to its upper end of the bottom tube, the bottom tube having inner circumferential constrictions;
- a generally cylindrical top tube slidably disposed in a telescoping manner within said bottom tube, the top tube having at least one circumferential groove;
- the locking collar assembly comprising a slidable collar having a locking groove and a release groove, said collar being slidably connected to an end of said bottom tube, a plurality of locking balls held captive between said top tube and said collar, and a bias spring operably positioned within an annular space formed between the locking collar and the top tube;
- a connecting fixture attached to a top end of the top tube;
- wherein the connecting fixture comprises a threaded bore for receiving a retaining bolt.

8. A pole comprising:
- a generally cylindrical bottom tube having a slidable locking collar assembly connected to an upper end of the bottom tube;
- a generally cylindrical top tube slidably disposed within said bottom tube, the top tube having at least one circumferential groove;
- at least one middle tube slidably positioned between the bottom tube and the top tube, the middle tube having at least one circumferential groove, and a slidable locking collar assembly connected to its upper end;
- wherein for each pair of adjacent tubes, the outermost tube is an outer tube and the innermost tube is an inner tube;
- each of the locking collar assemblies comprising a slidable collar having a locking groove and a release groove, said collar being slideably disposed external to an end of the outer tube, a plurality of locking balls held captive between the inner tube and the collar, and a bias spring operably positioned within an annular space formed between the locking collar and the inner tube;
- a head member connectable to a top end of the top tube; and
- a pivot member being adapted to be coupled to the support load at a first end and is coupled to the head member at a second end such that a ball-and-socket joint is formed between the head member and the pivot member.

9. The pole of claim 8, wherein the middle tube has at least one inner circumferential constriction.

10. An adjustable joint comprising:
- a first tube and a second tube, the second tube being slidably insertible within the first tube, the second tube including at least one circumferential groove formed in its outer surface, the first tube including a plurality of ball retaining holes formed proximate a first end thereof;
- a collar that is axially displaceable between a locked position and a released position connected to the first end of the first tube, the collar having a locking groove and a release groove;
- a plurality of locking balls retained between said collar and said first tube, the balls being operably positioned within the ball retaining holes, such that the balls are radially movable when the collar is in its released position and the balls are radially immovable when the collar is in its locked position;
- wherein the collar has a plurality of vertical bottom slots for permitting contamination that enters the collar to fall out of the collar.

11. A tubular pole which comprises:
- an upper inner tube and a lower outer tube in telescoping and rotatable relation;
- a lock mechanism positioned at the upper end of the lower tube in axially and rotatably movable relation with said tubes, said mechanism comprising:
  - a one-piece collar surrounding and extending beyond the upper end of the lower tube to form an enclosed annular space with said tubes;
- wherein said lock in a first axial position locking said tubes against axial movement relative to one another and in a second axial position enabling said tubes to move axially relative to one another; and
- a plurality of vertically disposed slots in the bottom of said collar to enable contamination to drop out of the collar.

12. A pole as defined in claim 11, wherein the lock mechanism comprises a ball lock mechanism.

13. A pole as defined in claim 11, wherein the collar has an internal surface which includes two superposed circumferential recesses, one of the recesses being deeper than the other recess, and wherein the lock mechanism further comprises a plurality of balls positionable in the shallower recess when the mechanism is in said first axial position and in the deeper recess when the mechanism is in said second axial position.

14. A pole as defined in claim 11 which further comprises an internal borerider provided near the upper end of said lower tube.

15. A pole as defined in claim 11 which further comprises an external borerider provided on the inner tube proximate the lower end of the inner tube.

16. A pole as defined in claim 11 which further comprises a spring positioned in said annular space biased to urge said mechanism to said first axial position.

17. A tubular pole which comprises:

an upper inner tube and a lower outer tube in telescoping and rotatable relation;

a ball lock mechanism positioned at the upper end of the lower tube in axially and rotatably movable relation with said tubes, said mechanism comprising:

a one-piece collar surrounding and extending beyond the upper end of the lower tube to form an enclosed annular space with said tubes, and plurality of balls positioned in said annular space;

said mechanism in a first axial position locking said tubes against axial movement relative to one another and in a second axial position enabling said tubes to move axially relative to one another; and a plurality of vertically disposed slots in the bottom of said collar to enable contamination to drop out of the collar.

* * * * *

UNITED STATES PATENT AND TRADEMARK OFFICE
CERTIFICATE OF CORRECTION

PATENT NO.   :   5,593,239

DATED        :   January 14, 1997

INVENTOR(S)  :   Sallee

It is certified that error appears in the above-identified patent and that said Letters Patent is hereby corrected as shown below:

In claim 6, column 9, line 37, please delete "comprises threaded" and insert -- comprises a threaded -- therefor.

Signed and Sealed this

Twenty-second Day of April, 1997

Attest:

BRUCE LEHMAN

*Commissioner of Patents and Trademarks*

*Attesting Officer*